United States Patent [19]

Hilsenrath et al.

[11] Patent Number: 5,926,812
[45] Date of Patent: Jul. 20, 1999

[54] DOCUMENT EXTRACTION AND COMPARISON METHOD WITH APPLICATIONS TO AUTOMATIC PERSONALIZED DATABASE SEARCHING

[75] Inventors: Oliver A. Hilsenrath, Alamo; Ron Carmel; Hagai Ariel, both of San Ramon, all of Calif.

[73] Assignee: Mantra Technologies, Inc., San Ramon, Calif.

[21] Appl. No.: 08/829,451

[22] Filed: Mar. 28, 1997

Related U.S. Application Data

[60] Provisional application No. 60/018,800, Jun. 20, 1996.
[51] Int. Cl.[6] ................................................ G06F 17/30
[52] U.S. Cl. .............................. 707/5; 707/6; 707/513; 395/200.47
[58] Field of Search ................................ 707/5, 6, 1–4, 707/501, 513; 395/200.47, 200.48

[56] References Cited

U.S. PATENT DOCUMENTS

| | | | |
|---|---|---|---|
| 4,839,853 | 6/1989 | Deerwester et al. | 707/5 |
| 5,619,709 | 4/1997 | Caid et al. | 707/2 |
| 5,724,571 | 3/1998 | Woods | 707/5 |
| 5,754,938 | 5/1998 | Herz et al. | 455/4.2 |

OTHER PUBLICATIONS

"Assignment of Term Descriptors to Clusters,", Bhatia et al., Proceddings of the 1990 Symposium on Applied Computing, USA, IEEE Computer Society, pp. 181–185, Apr. 1990.
"Search and Ranking Algorithms for Locating Resources on the World Wide Web," Yuwono et al., Procedings of the Twelfth International Conference on Data Engineering, CA, USA, pp. 164–171, IEEE, Feb. 1996.

*Primary Examiner*—Thomas G. Black
*Assistant Examiner*—Hosain T. Alam
*Attorney, Agent, or Firm*—Lumen Intellectual Property Services

[57] ABSTRACT

A computer-implemented method for comparing the contents of two sets of documents includes the step of extracting from a set of documents [44] corresponding sets of document extract entries [46]. The method further includes a step of generating from the sets of document extract entries [46] corresponding sets of word clusters [48]. Each word cluster comprises a cluster word list having N words, an N×N total distance matrix, and an N×N number of connections matrix. The preferred embodiment includes a step of grouping similar word clusters and combining the similar word clusters to form a single word cluster for each group. The grouping comprises evaluating a measure of cluster similarity between two word clusters, and placing them in a common group of similar word clusters if the measure of similarity exceeds a predetermined value. The step of evaluating cluster similarity comprises intersecting clusters to form subclusters and calculating a function of the subclusters. In the preferred embodiment, the method is implemented in a system to automatically identify database documents which are of interest to a given user or users. In this implementation, the method comprises the step of automatically deriving the first set of documents from a local data storage device, such as a user's hard disk. The method also comprises the step of deriving the second set of documents from a second data storage device, such as a network machine. This application of the invention, therefore, provides fast and accurate searching to identify documents of interest to a particular user or users without any need for the user or users to specify what search criteria to use.

15 Claims, 8 Drawing Sheets

Total Distance Matrix

|  | Word 1 | Word 2 | Word 3 | Word 4 | Word 5 | Word 6 |
|---|---|---|---|---|---|---|
| Word 1 | (1,1) |  |  |  |  | (1,6) |
| Word 2 |  |  |  |  |  |  |
| Word 3 |  |  |  |  |  |  |
| Word 4 |  |  |  |  |  |  |
| Word 5 |  |  |  |  |  |  |
| Word 6 | (6,1) |  |  |  |  | (6,6) |

FIG. 12

No. of Connections Matrix

|  | Word 1 | Word 2 | Word 3 | Word 4 | Word 5 | Word 6 |
|---|---|---|---|---|---|---|
| Word 1 | (1,1) |  |  |  |  | (1,6) |
| Word 2 |  |  |  |  |  |  |
| Word 3 |  |  |  |  |  |  |
| Word 4 |  |  |  |  |  |  |
| Word 5 |  |  |  |  |  |  |
| Word 6 | (6,1) |  |  |  |  | (6,6) |

DOCUMENT EXTRACTION AND COMPARISON METHOD WITH APPLICATIONS TO AUTOMATIC PERSONALIZED DATABASE SEARCHING

RELATED APPLICATION

This application is based upon copending provisional patent application Ser. No. 60/018,800 filed Jun. 20, 1996 entitled "Personal Web Map System", which is incorporated herein by reference.

BACKGROUND

The field of the invention relates to computer implemented methods for determining the similarity of the contents of text documents. In particular, the field of the invention relates to applications of such methods to searching large databases, such as hypertext documents on the Internet, and to automatically producing personalized content without requiring a user or users to provide or update personalized searching criteria.

There are known techniques for the comparison of text files to determine similarity and difference of content, and for providing personalized content to a user. A common difficulty of present techniques is that they often return inappropriate matches or miss desired matches. For example, the list of documents retrieved by a typical Internet search engine usually contains a large fraction of irrelevant items and misses a large fraction of relevant items. Although sophisticated searching techniques employing artificial intelligence and the like can improve the quality of searching, these techniques usually require a lengthy training phase. Additionally, many present searching systems require the user to manually select personalized search criteria. This process is laborious, time consuming, and often requires the user to learn cryptic searching syntax. It also has the disadvantage that as the user's interests change with time, the personalized criteria must be manually modified.

In summary, conventional systems for searching large data bases do not contain simple and fast techniques for comparing documents and correctly determining their similarity. In particular, conventional database searching techniques lack the ability to permit documents to be compared quickly and to enable their similarity to be determined with high accuracy. Conventional methods also fail to provide simple database searching techniques that can identify documents of interest to a user or users without requiring the user or users to manually provide personalized searching criteria, and without requiring the user or users to update such criteria.

Accordingly, there is a need to provide a method for accurately and quickly comparing the contents of text documents and determining their similarity. It also would be desirable to provide such a method which may be used to implement an improved database searching system. What is also needed is a database searching system that automatically identifies documents of interest to a user or users without requiring the user or users to specify any search criteria. There is also a need for a system which provides automatic updates to the search criteria without requiring direct user intervention.

SUMMARY

One aspect of the invention provides a computer-implemented method for comparing the textual data of two sets of documents. The method includes the step of extracting from the two sets of documents corresponding sets of document extract entries. In the preferred embodiment, each document extract entry comprises a weighted word histogram for its corresponding document, a list of people and a list of companies. The weighted word histogram comprises a set of histogram word records, each of which comprises a word from the document, a word score, a number of appearances of the word in the document, and a list of position indices for the word within the document.

The method further includes a step of generating from the sets of document extract entries corresponding sets of word clusters. Each word cluster comprises a cluster word list having N words, an N×N total distance matrix, and an N×N number of connections matrix. In the preferred embodiment, each number of connections matrix contains information about the connections between words in the document, and the total distance matrix contains information about the total distances between words in the document. The cluster word list is determined by recursively calling a procedure that returns a list of words within a predetermined distance from a given word in the document, and calculating the number of connections matrix by repeatedly calling a procedure that determines the number of connections in the document between words.

The preferred embodiment includes a step of grouping similar word clusters and combining the similar word clusters to form a single word cluster for each group. The grouping comprises evaluating a measure of cluster similarity between two word clusters, and placing them in a common group of similar word clusters if the measure of similarity exceeds a predetermined value. The step of evaluating cluster similarity comprises intersecting clusters to form subclusters and calculating a function of the subclusters. Similar word clusters are combined by concatenating their word lists to form a combined word list, merging their total distance matrices, and merging their word connection matrices.

The method of the invention further includes a step of determining a degree of similarity between clusters, in particular, between a cluster generated from the first set of word clusters and a cluster generated from the second set of word clusters. In the preferred embodiment, the determining step comprises intersecting two clusters from the two sets of clusters, thereby forming subclusters, and calculating a function of the subclusters. The function is a measure of similarity of the clusters and its calculation includes the determination of values such as a sum of diagonal matrix elements, a sum of off-diagonal matrix elements, and a sum of all matrix elements.

In the preferred embodiment, the method is implemented in a system to automatically identify database documents which are of interest to a given user or users. In this implementation, the method comprises the step of deriving the first set of documents from a local data storage device, such as a user's hard disk. This first set of documents is derived by selecting the set of files that are associated with the user or users. In this implementation the extracting step comprises converting the first set of documents to hypertext format. It is a unique feature of the present invention that the first set of documents is customized to a particular user and generated automatically without requiring the user to manually select search criteria. The method also comprises the step of deriving the second set of documents from a second data storage device. For example, the documents may be web documents retrieved via a network data connection. This application of the invention, therefore, provides fast and accurate searching to identify documents of interest to a particular user or users without any need for the user or users to specify what search criteria to use.

DESCRIPTION OF THE DRAWINGS

The foregoing and other features, aspects and advantages of the invention will become better understood with regard to the following description, appended claims and accompanying drawings in which:

DETAILED DESCRIPTION

Although the following detailed description contains many specifics for the purposes of illustration, anyone of ordinary skill in the art will appreciate that many variations and alterations to the following details are within the scope of the invention. Accordingly, the following preferred embodiment of the invention is set forth without any loss of generality to, and without imposing limitations upon, the claimed invention.

Overview

Figure 1:
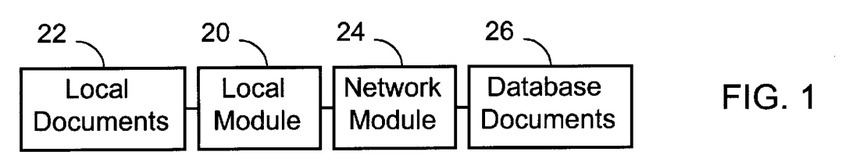
FIG. 1 is a block diagram of the automatic database searching system of the present invention.

In a preferred embodiment of the invention, a method of efficiently and accurately comparing the contents of documents is implemented in an automatic database searching system, as shown in FIG. 1. The system may be decomposed into a local module 20 having access to local documents 22, and a network module 24 having access to database documents 26. In addition, local module 20 and network module 24 are in communication with each other. As will be described in detail in what follows, local module 20 extracts from local documents 22 a set of document extract files. In a post-processing step, the local module then generates word clusters from the document extract files. Local module 20 also performs additional post-processing to combine similar clusters. These clusters represent the content of the original documents. In a preferred embodiment, the local module operates automatically upon documents associated with a given user, thereby generating a personalized interest profile without requiring the user to manually specify a profile or update a profile. Local module 20 communicates the word cluster profile to network module 24. Network module 24 constructs search engine requests and retrieves selected documents from the database documents 26. These documents are then extracted and clusters are formed from the extracts just as in the local module. The interest profile clusters are then compared with the selected database document clusters to determine which of the selected database documents match the interest profile. The matching documents are then retrieved in full to the network machine for efficient browsing by the user at a later time. All the above is performed automatically and without any user intervention or configuration. In addition, no profile updating is needed since the user files will automatically change as the user's interests change.

Figure 2:
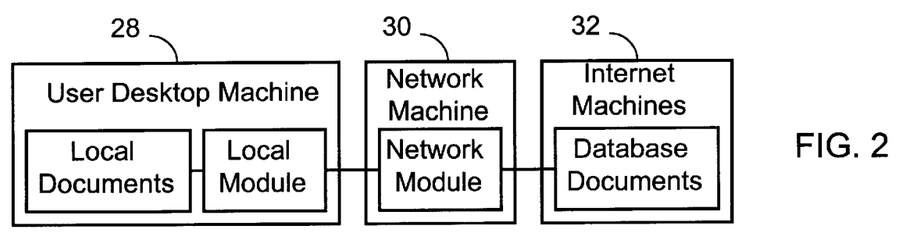
FIG. 2 is an implementation of the present invention in which the local documents and local module are contained on a user desktop machine, the network module is contained on a separate network machine, and the database documents are contained on Internet machines.
Figure 3:
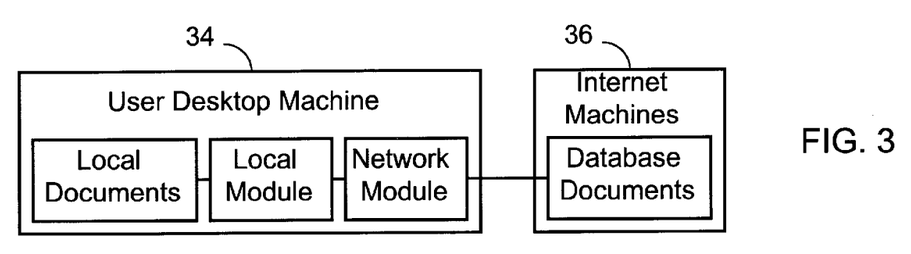
FIG. 3 is an implementation of the present invention in which the local documents, local module and network module are contained on a user desktop machine, and the database documents are contained on Internet machines.

The modules shown in FIG. 1 may be combined in various ways for different specific applications. For example, in an embodiment shown in FIG. 2, the local module and the local documents reside on a user desktop machine 28, the network module resides on a separate network machine 30, and the database documents reside on various database machines 32. FIG. 3 shows an embodiment wherein a user desktop machine 34 includes the network module in addition to the local module and local documents. The database documents reside on database machines 36, as in the previous embodiment.

Figure 4:
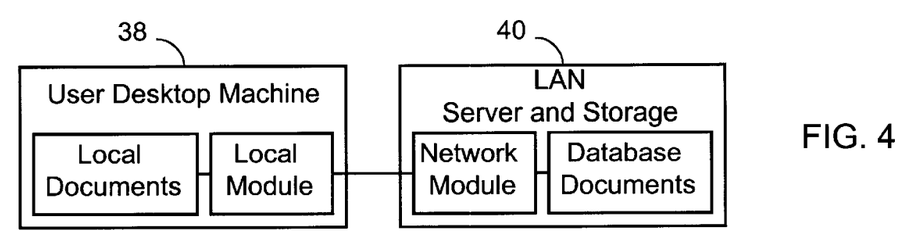
FIG. 4 is an implementation of the present invention in which the local documents and local module are contained on a user desktop machine, and the network module and the database documents are contained on local area network machines.
Figure 5:
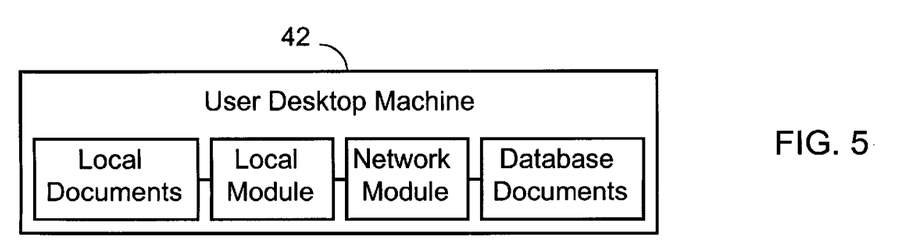
FIG. 5 is an implementation of the present invention in which the local documents, local module, network module, and the database documents are all contained on a user desktop machine.

FIG. 4 shows another embodiment wherein the database documents and network module both reside within a local area network (LAN) 40. A user desktop machine 38 contains the local module and local documents. In yet another embodiment, all four components, the local documents, the local module, the network module, and the database documents, reside on a single user desktop machine 42. The essential operation of the modules is largely independent of the specific embodiment chosen. Specific embodiments, however, also include certain implementation-specific operations, as will be seen in the descriptions of the particular embodiments.

Data Structures

Figure 6:
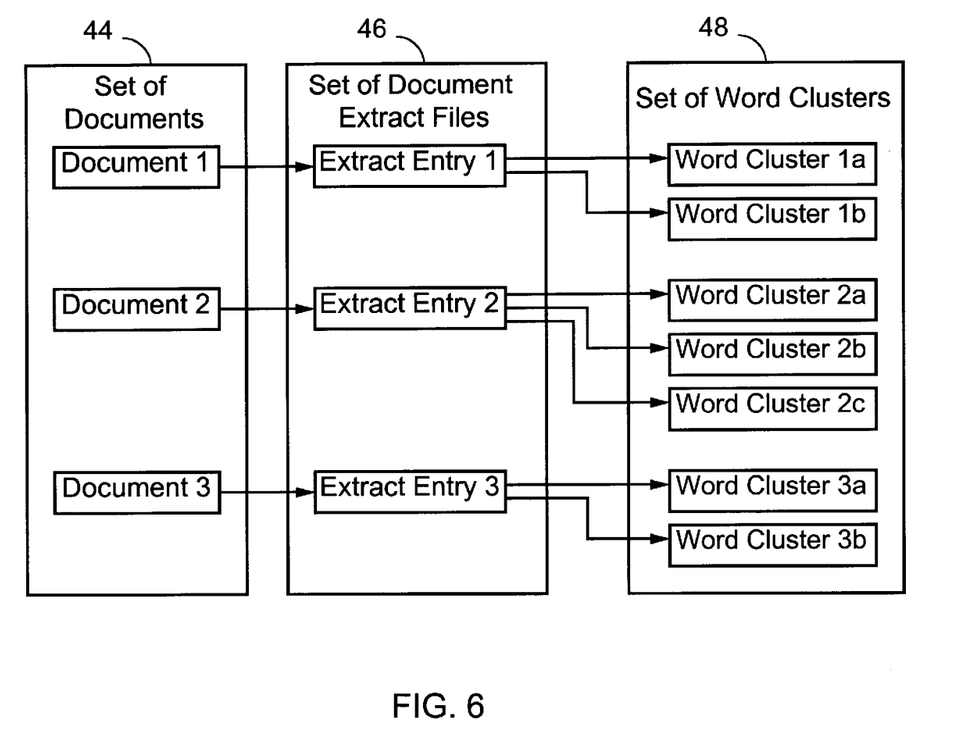
FIG. 6 is a schematic diagram outlining an aspect of the present invention in which extract entries are created from documents and word clusters are created from the extract entries.

The local module 20 uses local documents 22 to create document extract files and then to generate word clusters that represent the content of selected local documents. As shown schematically in FIG. 6, a set of documents 44 is used to create a set of document extract entries 46, which in turn is used to create a set of word clusters 48. In the preferred embodiment, each document gives rise to one extract entry. Each extract entry, however, can give rise to one or more word clusters, depending on the content of the extract entry and predefined parameters of the local module. For example, "Document 1" in FIG. 6 gives rise to "Extract Entry 1", which gives rise to "Word Cluster 1a" and "Word Cluster 1b". Note that FIG. 6 illustrates a case where the set of documents and the set of extract entries happen to have three elements. In general, of course, the sets may have any number of elements.

Figure 7:
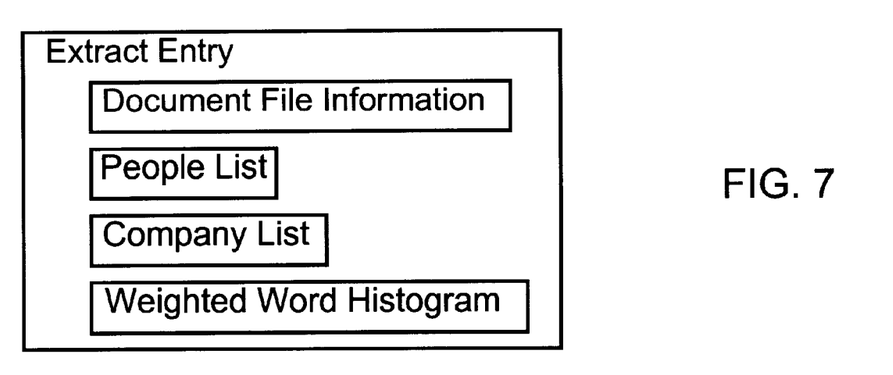
FIG. 7 is a schematic representation of the data structure of an extract entry according to the present invention.
Figure 8:
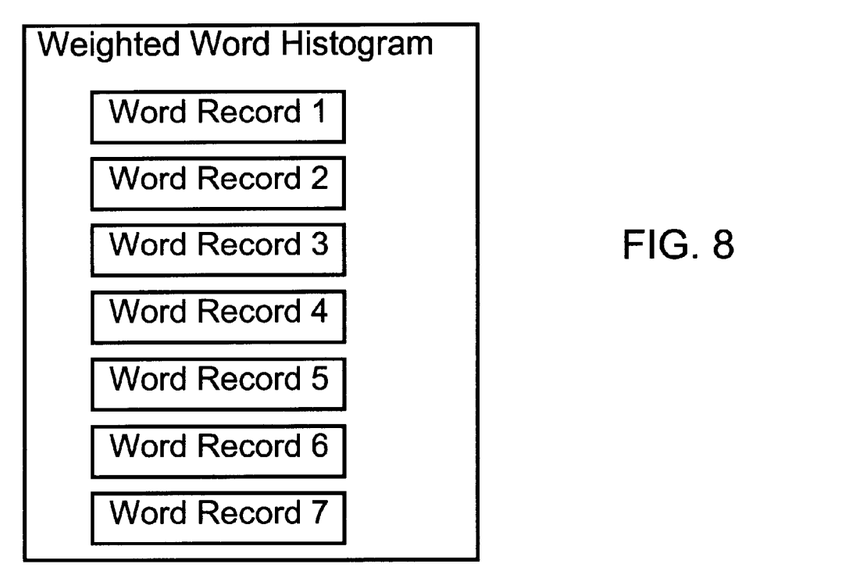
FIG. 8 is a schematic representation of the data structure of a weighted word histogram according to the present invention.
Figure 9:
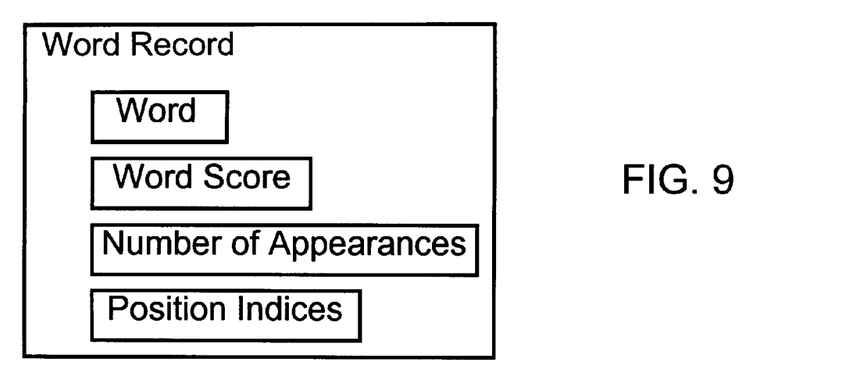
FIG. 9 is a schematic representation of the data structure of a word record according to the present invention.

FIG. 7 shows the content of an extract entry. It contains document file information, a people list, a company list, and a weighted word histogram. Document file information includes such data as the file type, the directory path for the file, and the last time the file was extracted. The people list contains names of people found in the document, and the company list contains names of companies found in the document. The weighted word histogram contains a list of word records, as shown in FIG. 8 in the case where there happen to be seven word records. As shown in FIG. 9, each word record contains a word from the document, a word score which is a measure of the importance of the word within the document, the number of appearances of the word in the document, and a set of word position indices which contains the positions of the word in the document. The extraction method used to generate extract entries from documents will be described in detail later.

Figure 10:
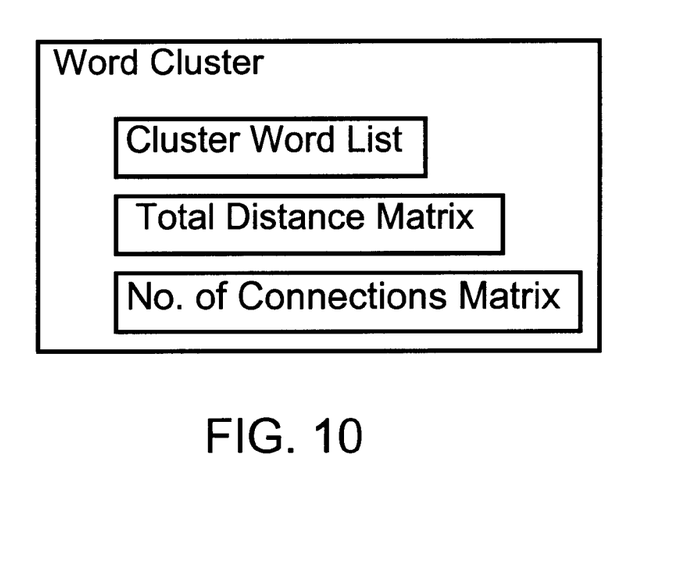
FIG. 10 is a schematic representation of the data structure of a word cluster according to the present invention.
Figure 11:
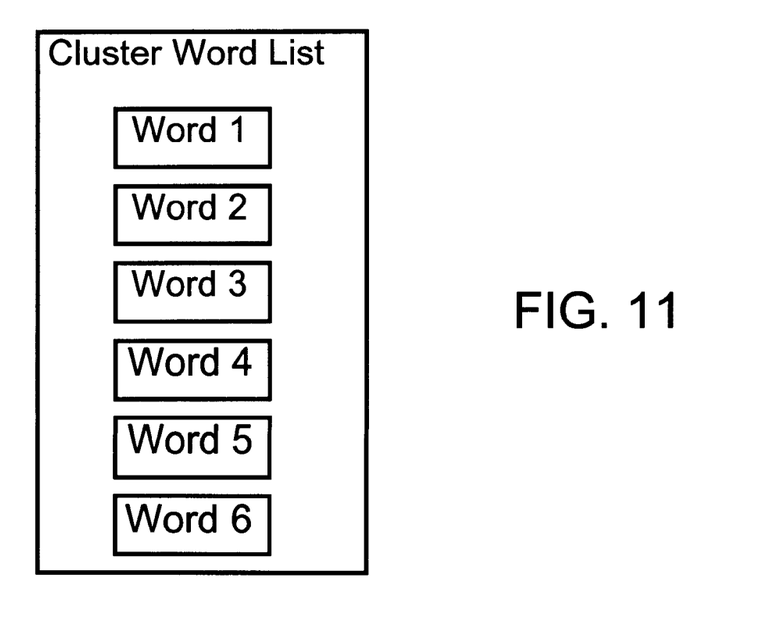
FIG. 11 is a schematic representation of the data structure of a cluster word list according to the present invention.

Based on the information contained within an extract entry, the local module generates one or more word clusters in a post-processing step. FIG. 10 shows the content of a word cluster. It contains a cluster word list, a total distance matrix, and a number of connections matrix. The cluster word list simply contains a list of words for the cluster, as shown in FIG. 11 in the case where the cluster happens to have six words. In general, of course, the cluster word list may have any number N of words.

Figure 12:
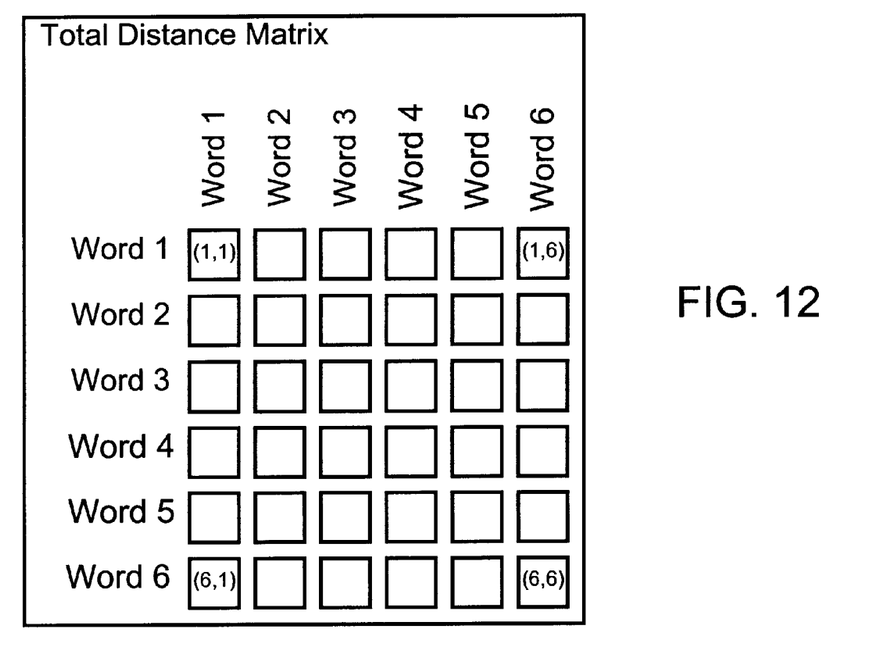
FIG. 12 is a schematic representation of the data structure of a total distance matrix according to the present invention.

The total distance matrix is shown in schematic form in FIG. 12. It contains N×N elements indexed by an ordered pair of integers (ij), where i and j range from 1 to N. The value of the (ij) element of the total distance matrix is the total distance between all appearances of word i and all appearances of the word j, when word i appears before word j. In this context, the distance between two words is taken to mean the number of words separating one from the other. For example, two adjacent words have a separation of one. The diagonal entries of the total difference matrix are used to store the scores for the words.

Figure 13:
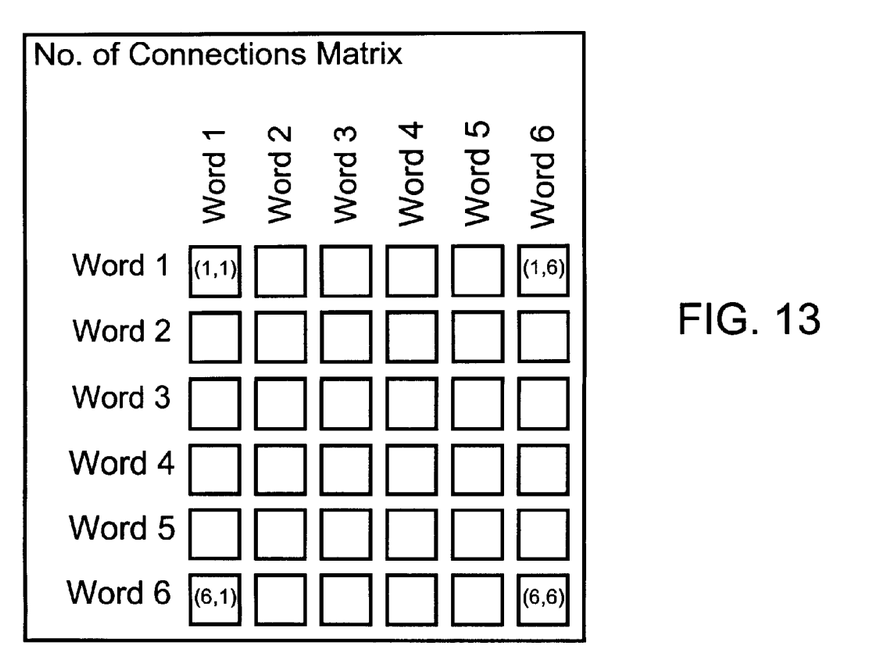
FIG. 13 is a schematic representation of the data structure of a number of connections matrix according to the present invention.

The number of connections matrix is shown in schematic form in FIG. 13. It contains N×N elements indexed by an ordered pair of integers (ij), where i and j range from 1 to N. The value of the (ij) element of the number of connections matrix is the total number of connections between all appearances of word i and all appearances of the word j, when word i appears before word j. In this context, a connection between two words is taken to mean an appearance of one word within a predetermined range of the other. A more specific description of the connection will be described below in relation to the method for calculating connections. The diagonal entries of the number of connections matrix are used to store the number of appearances of the words. The details of the method used to generate clusters from extract entries will be described in detail later.

Figure 14:
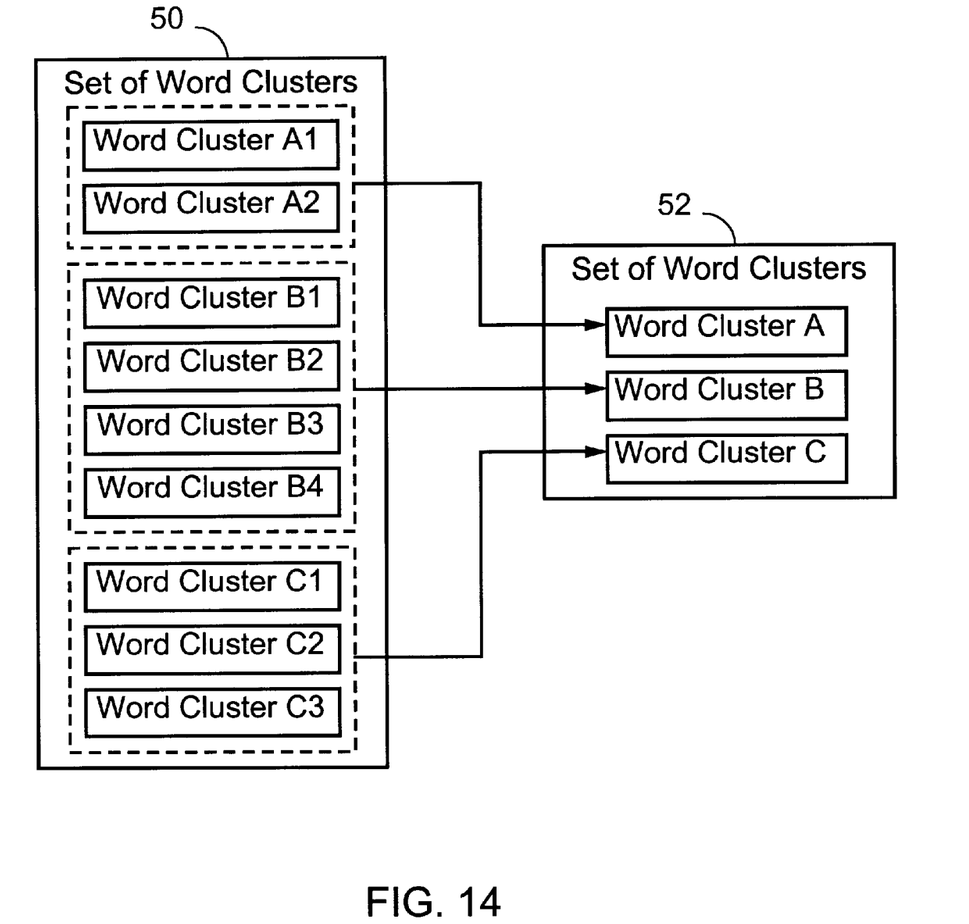
FIG. 14 is a schematic diagram outlining an aspect of the present invention in which similar word clusters are combined into single word clusters.

In an additional post-processing step, the local module combines groups of similar clusters into single clusters, as shown schematically in FIG. 14 in the particular case where a set 50 of nine clusters are collected into three groups. The clusters in each group are then combined to form a set 52 with three clusters. Any two clusters may be combined by taking the union of their cluster word lists and merging their matrices.

Figure 15:
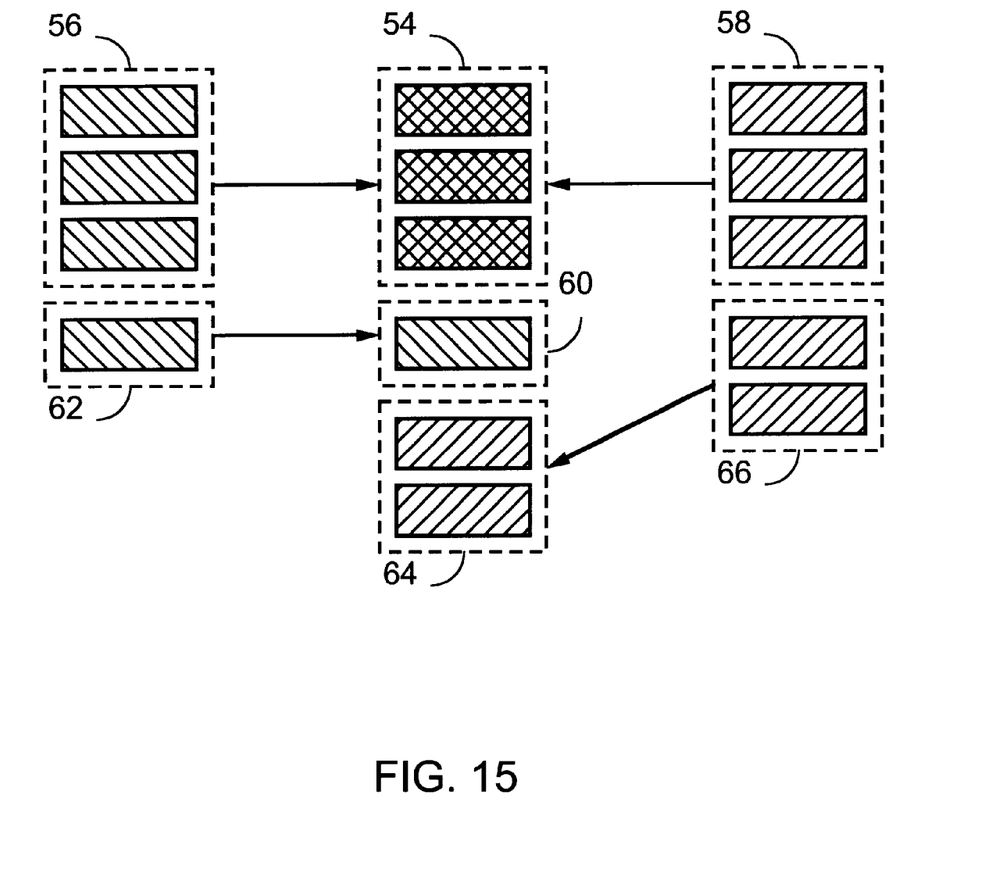
FIG. 15 is a schematic diagram representing the manner in which cluster word lists are combined according to the present invention.

For example, FIG. 15 is a schematic representation of how two cluster word lists are combined. In this example, a first cluster word list has four words, a second has five words, and the two lists have three words in common. Therefore, the new cluster word list contains six words: the three common words 54 corresponding to three words 56 in the first list and the three words 58 in the second list, one word 60 corresponding to the one remaining word 62 from the first cluster, and two words 64 corresponding to the two remaining words 66 from the second cluster.

Figure 16:
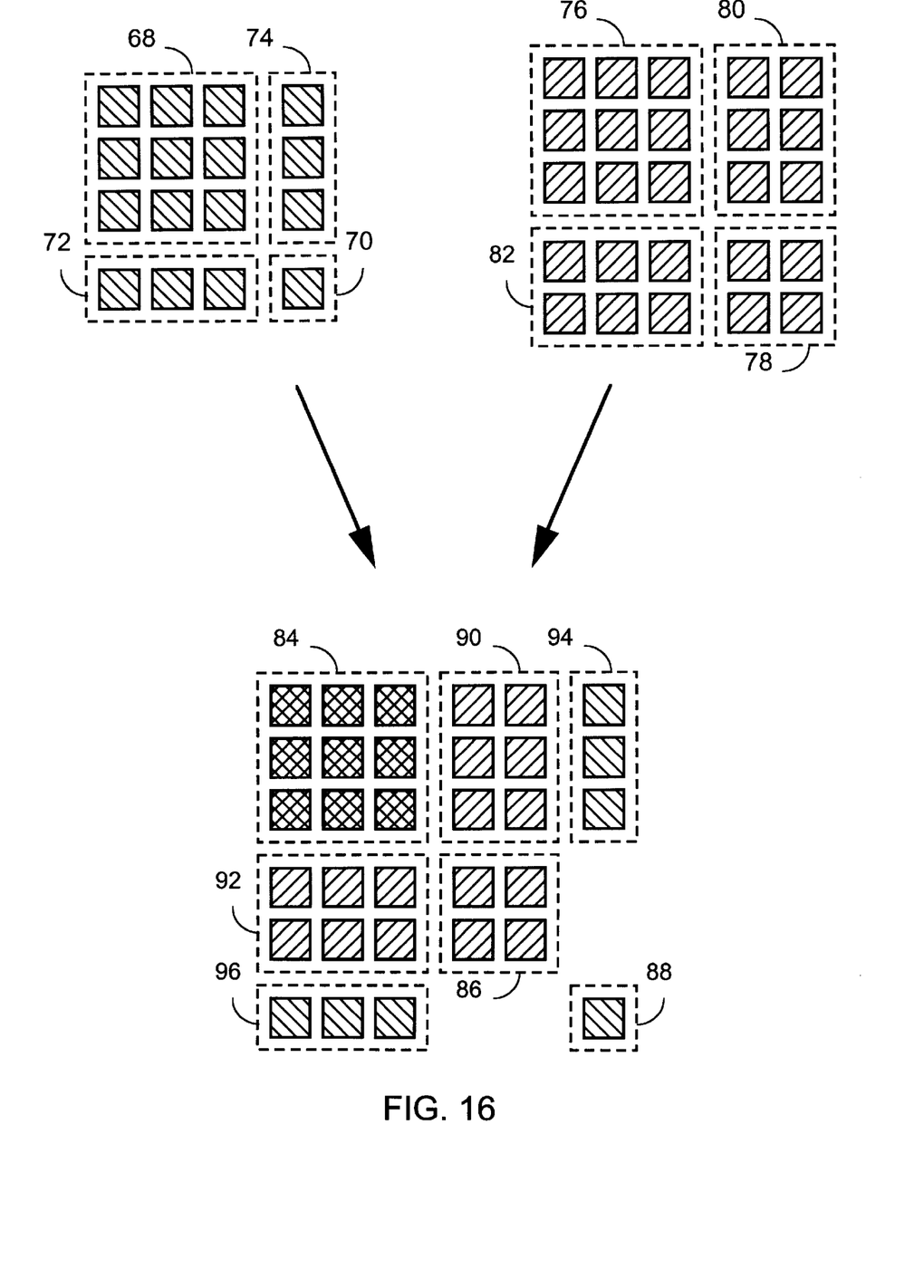
FIG. 16 is a schematic diagram representing the manner in which cluster matrices are combined according to the present invention.

FIG. 16 illustrates how the corresponding matrices from the same two clusters are merged. Since the clusters have three words in common, their respective matrices are divided into sub-matrices, as shown. The 4×4 matrix for the first cluster is divided into four sub-matrices: a 3×3 matrix 68 corresponding to the three words it shares with the second cluster, a 1×1 matrix 70 corresponding to the one word it does not share with the second cluster, a 1×3 matrix 72, and a 3×1 matrix 74. Similarly, the second cluster's 5×5 matrix is divided up into four sub-matrices: a 3×3 matrix 76 corresponding to the three words it shares with the first cluster, a 2×2 matrix 78 corresponding to the two words it does not share with the first cluster, a 3×2 matrix 80, and a 2×3 matrix 82. The first and second matrices are merged to form a 6×6 matrix, as shown. This 6×6 matrix contains a 3×3 matrix 84 whose entries contain the sum of the corresponding entries for 3×3 matrices 68 and 76. It also contains a 1×1 matrix 86 corresponding to the 1×1 matrix 70 from the first cluster, a 2×2 matrix 88 corresponding to the 2×2 matrix 78 from the second cluster, a 3×1 matrix 90 and a 1×3 matrix 92 corresponding to the 3×1 matrix 74 and the 1×3 matrix 72, and a 3×2 matrix 94 and a 2×3 matrix 96 corresponding to the 3×2 matrix 80 and the 2×3 matrix 82. The vacancies in the 6×6 matrix are set to zero.

Local Module—Automatic Operation

In the preferred embodiment, the local module is programmed to automatically and periodically examine local documents and generate a custom interest profile comprising word clusters. The local module is programmed to begin its operation automatically at times when the user is idle. These times may be determined by monitoring system use using various techniques such as recording the activation and deactivation times of a screen saver program. When the user is idle and is likely to remain idle based on past usage, the local module is activated. If the user returns to activity before the local module has completed its tasks, the local module operation is suspended until the computer becomes idle again. In this way, the operation of the local module does not consume computational resources when the computer is active.

Although the present system is unique in its capability to generate an interest profile without any direct manual input from or interaction with the user, this key feature does not preclude the user from manually and intentionally affecting the interest profile if desired. The present invention, therefore, may be easily adapted for use with present content provider systems to improve and augment their capabilities. This allowance for manual as well as automatic control of the profile is to be distinguished from prior art systems which depend upon and require manual input for their operation.

Local Module—Examination

The local module is programmed to examine a local data storage device for files which are associated with a specified user. If the user is working within a LAN, then user files on many different machines can be included in the examination. The examined files may include the user's word processor documents, spreadsheets, electronic mail, preferences files, user interface files, and the like. If a file has not been modified since it was last extracted, it is not necessary to repeat the extraction process. Accordingly, those files which have been modified or created since the last extraction are marked for extraction. The examination updates information about all user files, such as the last time each file was read, the last time each was modified, the type of file, and so on.

Local Module—Extraction

The extraction process is applied to any file marked for extraction. Prior to the extraction proper, however, any file that is not already in hypertext markup language (HTML) format is converted to a temporary HTML file by one of many well-known standard HTML conversion methods. A document extraction procedure is then applied to each HTML document, thereby creating a new or updated document extract file entry for the document. The extract entry, as shown in FIG. 7, contains document file information, a people list, a company list, and a weighted word histogram. The structure of the weighted word histogram is described in detail above in relation to FIGS. 8 and 9.

The document extraction procedure identifies names within a document by searching for capitalized words after "Mr.", "Mrs.", "Ms.", "Prof.", "Dr.", etc., and for capitalized words before "Sr.", "Jr.", "Ph.D.", "J.D.", "M.D.", "CEO", etc. Similarly, it identifies company names by searching for capitalized words followed by "Co.", "Inc.", "Ltd.", "Corp.", "Technologies" etc. In generating the weighted word histogram, the procedure either ignores or deletes from the document all words such as "a", "the", "and", "it", "some", "him", "her", "it", etc. The weighted word histogram contains a word record for each distinct word present in the document. Each word record contains the word or a code for the word. Each record also contains a word score which is a measure of the importance of the word within the document. The word score is determined from the hypertext tags associated with the word. For example, if a word appears in a heading, it is given a higher score than if the word appears in a regular paragraph. Various HTML tags are assigned predetermined values. The word record also contains a number of appearances of the word in the document, and its position indices. The position indices for a word are simply the word positions of each appearance of the word in the document. Note that it is possible to include other significant information about words in the document, or to combine various forms of information together to create composite weights. For example, the word scores for a document can be decreased if the document has not been accessed in a long time, increased by a small amount if the document has been recently read, and increased by a large amount if the document has been recently modified.

When the extraction procedure is complete, the extract entries for all the user's files have been updated to reflect any changes since the last extraction. All temporary HTML files and other files related to the documents are not generally needed for subsequent steps. Only the extract entries are used.

Local Module—Generation of Word Clusters

In a post-processing stage executed after the document extract file has been updated, the local module creates one or more document word clusters from each extract entry. Word clusters contain information about the importance of various words in the document and their relationships to each other within the document, as will become clear from the following description. The post-processing stage further includes combining similar clusters to form composite clusters.

As described above in relation to FIGS. 10–13, a word cluster comprises a cluster word list, a total distance matrix, and a number of connections matrix. The cluster word list is a list of N words in the cluster. The total distance matrix is an N×N matrix whose (ij) element contains a total distance between word i and word j when word i precedes word j. The diagonal element (i,i) contains the score of word i in the document. The number of connections matrix is an N×N matrix whose (ij) element contains a number of connections between word i and word j when word i precedes word j. The diagonal element (i,i) contains the number of appearances of word i in the document.

In the post-processing stage, a set of one or more initial word clusters is produced from each document extract entry, then similar clusters are merged. An initial cluster is formed for the most significant words in the weighted word histogram for the document. The significance of a word is derived from the score and/or number of appearances of the word. Other measures of significance may obviously be used without departing from the scope of the invention.

An initial word cluster for a word is constructed as follows. First, a cluster word list is determined from document extract entry by recursively calling a procedure that returns a list of other words within a predetermined distance from the word. For example, if the initial word is "mountain", then a procedure will examine the weighted word histogram and return a list of other words within a predefined number of words to the right and left of each appearance of "mountain". This predefined number of words is called the breadth. Suppose it found two such words: "bike" and "trail". The procedure is then called again for each of these two words and returns a list of other words close to "bike", and a list of other words close to "trail". The cluster word list is simply a list of the words found through this recursive procedure, in this example, "mountain", "bike", "trail", and the others. In the preferred embodiment, the recursive depth is limited to a predefined number called the depth. It is also terminated in the case where no new word is found. There are thus two parameters which are used in determining a cluster word list: the breadth of the search and the depth of the search. The breadth is a measure of how closely positioned words must be, and the depth is a measure of the maximum number of degrees of separation (i.e. recursive calls) between the words. If a first and second word are within breadth words of each other in at least one of their appearances, it is said that they are connected.

If there are N words in the cluster word list, the number of connections matrix contains N×N elements. The (ij) element contains the total number of connections between word i and word j when word i appears before word j. For example, if "mountain bike" appears ten times in a document, then the number of connections of "mountain" to "bike" is at least ten. Note that this number is usually different from the number of connections of "bike" to "mountain" since the order of the words is taken into account. Accordingly, two words are considered to be closely associated with each other if their number of connections in one order differs from their number of connections in another order. The total number of connections in either order, of course, also indicates that they are closely associated.

The total distance matrix also has N×N elements. The (ij) element contains the sum of the distances between word i and word j for all connections of word i with word j when word i appears before word j. Thus, the ratio of total distance matrix element (ij) with number of connections matrix element (ij) is the average distance between word i and word j for all connections between word i and word j when word i appears before word j. The total distance matrix, as well as the number of connections matrix, are easily calculated based on the above descriptions and techniques well known in the art.

Local Module—Grouping and Combination of Word Clusters

The initial word clusters that are generated from a document extract entry typically fall into various natural groups which roughly correspond to topics or subject areas of interest to the user. The purpose of the next stage in the post-processing is to compare the initial word clusters with each other to determine their degrees of similarity, to group similar clusters together, and to merge the similar clusters into a single cluster for each group.

The comparison of one cluster with another is performed as follows. First, an intersection of the clusters is determined by finding the words shared in common by their cluster word lists. For example, FIG. 15 shows two clusters that share three words in common. These common words partition the cluster word lists into shared and non-shared words. They also partition each cluster matrix into four submatrices, a square matrix corresponding to the shared words, a square matrix corresponding to the non-shared words, and two remaining hybrid matrices. An example of this division of the matrices is shown in FIG. 16. Note that a rearrangement of the rows and columns of the matrices may be necessary for them to appear as shown in FIG. 16. Such a rearrangement, however, is not actually required.

After the matrices of the two clusters have been divided as described above, their degree of similarity can be determined as follows. A measure of similarity is calculated using certain values derived from the eight submatrices from the two clusters. Examples of such values are (1) the sum of the diagonal elements in one of the four square matrices, (2) the sum of the off-diagonal elements in one of the four square matrices, and (3) the sum of all elements in one of the four hybrid matrices. These various quantities give information about the degree of similarity between the two clusters and can be combined in various ways to construct measures of cluster similarity. For example, let $C_1$ be the sum of the diagonal elements of the shared matrix 68 for the first cluster. $C_1$ is then a measure of the total number of appearances of the shared words in the first document. Let $D_1$ be the sum of the diagonal elements of the non-shared matrix 70 for the first cluster. $D_1$ is then the total number of appearances of the non-shared words in the first document. For closely related clusters, $C_1$ should be large in comparison with $D_1$. The same should be true of the corresponding values of $C_2$ and $D_2$ for the second cluster. Thus, three possible measures of similarity of the two clusters are $$S=(C_1+C_2)/(D_1+D_2),$$

$$S=C_1/D_1+C_2/D2,$$

and $$S''=0.5[C_1/(C_1+D_1)+C_2/(C_2+D_2)].$$

The advantage of the last measure, S" is that it has been constructed so that it always takes values between 0 and 1, where a value of 1 corresponds to identical clusters and a value of 0 corresponds to entirely distinct clusters. For more subtle and refined measures of similarity, the off-diagonal elements and the hybrid matrices can also be included into the calculation. Other measures can use the total distance matrix, the number of connections matrix, or both in combination. It is an important aspect of the present invention that the clusters, and these matrices in particular, allow for the construction and use of very subtle measures of similarity between documents.

If the measure of similarity of two clusters exceeds a predetermined threshold value, then the two clusters are grouped together. Two clusters in the same group are merged to form a single cluster as illustrated in FIG. 16. The new cluster word list comprises the union of the word lists of the two original clusters, and the matrices of the two clusters are merged as shown in the figure and as described in detail previously.

Local Module—Transfer Clusters to Network Module

After all the similar word clusters have been merged, the resulting clusters represent distinct "subject areas of interest" for the user whose files were extracted. The local module then transfers these word clusters to the network module. The local module has then completed its cycle and it now awaits activation for the next automatic update.

In embodiments where the local module communicates with the network module via a network connection (e.g. the embodiment shown in FIG. 2), it is useful to have a method for transferring the cluster data from the client machine to the network machine using standard communication tools. Accordingly, an aspect of the present invention includes the following novel and advantageous technique for transmitting the cluster data to the network machine. The technique includes imbedding cluster data into fields contained in an HTML form submission. In conventional HTML form submission, a client requests a form from the server, the user manually updates values in the page, and returns it to the server. The present technique, in contrast, automatically embeds the cluster data into a form and submits it to the network machine without any user intervention. The entire process is transparent to the user. In a preferred embodiment of the invention, the cluster data may be compressed, encrypted, or both.

Network Module—Overview

The network module has the basic task of determining matches between the database documents and the cluster data it has received from the local module. In the preferred embodiment, the database documents are stored on a network. The network module uses the cluster data to generate search strings which are then submitted to one or more third party search engines. The network module retrieves the documents corresponding to the best matches and then generates corresponding document extract entries. The network module then generates a set of word clusters for each extract entry. These clusters are then compared with the clusters from the local module using a measure of similarity. If a database document cluster is sufficiently similar to a cluster from the local module, then the database document is considered to be a match with the local documents. The document is then downloaded to the network machine together with its associated resource files. The result is a collection of documents located at the network machine. These documents are thus available for fast and convenient access by the local module. This predictive caching technique is unique in that the documents are retrieved by and stored at the network machine before the user requests a document for the first time. As a result, the benefits of caching are obtained even on the first access by the user. Conventional non-predictive caching, in contrast, has benefits only after the first access. The preferred embodiment also includes the convenient feature of organizing the personalized content for the user, e.g. in the form of a table of contents organized by subject.

Network Module—Generating Search Strings

After the network module receives a set of new word clusters from the local module its first step is to generate search engine submission strings based on the information in the clusters. The technique for generating these strings and retrieving documents using existing search engines is an important aspect of the present invention. This technique is able to avoid the inaccuracies in the existing search engines through the use of supplementary and more exact filtering which involves document extraction, cluster generation, and cluster similarity measurement.

For each cluster received from the local module, the network module creates a series of search strings of varying degrees of scope, as follows. A number M of most important words in the cluster is found by selecting those words from the cluster word list which have traits reflecting higher significance, e.g. a score larger than a predetermined threshold value. Alternatively, they could be chosen by how many appearances they have in the document, or by some combination of score and number of appearances that correlates with importance. These M important words, $w_1, w_2, \ldots, w_{M-1}, w_M$, can be combined to produce search strings varying from narrow to broad, as follows:

$S_1$: $w_1$ and $w_2$ and $w_3$ and $\ldots$ and $w_{M-2}$ and $w_{M-1}$ and $w_M$ $S_2$: $w_1$ and $w_2$ and $w_3$ and $\ldots$ and $w_{M-2}$ and ($w_{M-1}$ or $w_M$)

$S_3$: $w_1$ and $w_2$ and $w_3$ and $\ldots$ and ($w_{M-2}$ or $w_{M-1}$ or $w_M$)

$S_{M-2}$: $w_1$ and $w_2$ and ($w_3$ or $\ldots$ or $w_{M-2}$ or $w_{M-1}$ or $w_M$)

$S_{M-1}$: $w_1$ and ($w_2$ or $w_3$ or $\ldots$ or $w_{M-2}$ or $w_{M-1}$ or $w_M$)

$S_M$: ($w_1$ or $w_2$ or $w_3$ or $\ldots$ or $w_{M-2}$ or $w_{M-1}$ or $w_M$)

Other search strings can also be created using connectives such as "near". These connectives could be used, if necessary, to form strings of more or less restrictive scope.

The search strings are submitted to the search engine as follows. First, the most narrow string, $S_1$, is submitted to the engine and the document references, e.g. uniform resource locators (URLs), for the matches are added to a list of preliminary search results. If the number of document references in the list is less than a predetermined number of desired document references, then the next search string, $S_2$, which is slightly broader in scope than $S_1$, is submitted to the search engine. Any new document references that have not already been found are added to the list. If the number of document references in the list is still less than the predetermined number, then the next string, $S_3$, is submitted and the new document references are added to the list. This process continues until the desired number or document references is obtained.

Network Module—Retrieval, Extraction, and Cluster Generation

Once a sufficiently large list of document references has been obtained from the search engine, the network module attempts to retrieve the documents corresponding to these document references. Since some document references may be outdated, not all the documents can be retrieved. Consequently, the list of retrievable document references is a subset of the original list. If the retrieved documents are not already hypertext, they are converted to HTML by a conventional HTML converter. The network module then generates document extracts and clusters in the same manner as the local module, just as described above in relation to FIGS. 6–13. The result is a collection of word clusters associated with each of the database documents in the list of documents retrieved.

It is important to note that the local module transmits to the network module information indicating which clusters are new or modified and which are unchanged. Accordingly, the network module can intelligently eliminate unnecessary repetition of processing by taking into consideration the processing which has already taken place. For example, if only one cluster in the interest profile has been changed, then it may be advisable to only perform searches based on words from this modified cluster. Due to changes in the content of the database, however, periodic searches based on all the interest clusters may be performed, regardless of whether or not the interest profile has been changed.

Network Module—Document Relevance

After the network module has obtained clusters for the database documents retrieved, it then eliminates irrelevant documents by comparing the database clusters with the interest profile clusters and retaining only those documents whose clusters are sufficiently similar to one of the profile clusters. The network module determines similarity of clusters in the same way as the local module, just as described in detail above. A database document is discarded as irrelevant if, when its clusters are compared with the interest profile clusters, the similarity measure is never above a predefined minimum threshold.

In another embodiment, the search engine is adapted for searching based directly on cluster data rather than search strings. In this case, the generation of search strings from the clusters is by-passed entirely, and relevant documents are directly determined and returned from the search engine.

Network Module—Caching and Creating Custom Interface

In the next stage of its operation, the network module retrieves all the relevant database documents for the user together with their associated resource files, and creates a customized user interface which organizes the documents for convenient browsing. The result is a collection of documents at the network machine which are customized to the user and available for fast and convenient access. Because the documents have been transplanted to the network machine, however, certain internal document references must be changed so that, for example, a document properly refers to its resource files at the network machine rather than at the native web site of the document. Techniques for modifying internal document references (e.g. URLs) for this purpose are well-known in the art.

The user interface organizes the personalized content for the user in a form that is specially adapted to the user's preferences. For example, the content may be presented in the form of a table of contents organized by subject, or as a collection of icons, or a combination of words and icons. The form in which the information is organized and presented can be manually selected by the user, or can be automatically determined by the system based upon preferences information in the local documents. This can include such parameters as whether the user prefers to view information by icons or by words. The interface can also be automatically adjusted in the amount of detail it includes, depending on whether the user has more or less time to explore the information.

Variations

Obviously, the network machine can handle many different users at once, and is not limited to serving just one user or local module. In the case where a collection of users is known to have a large area of overlapping interests, the network module can save valuable storage space, processing time and network bandwidth on the network machine by performing collective caching for the group of users. For example, an academic department at a university may have its own network machine which performs collective caching for its users who are researchers in the same academic discipline.

In another embodiment, the database documents are documents existing on one or more local storage devices. For example, while a user is writing a research paper, article or book, the system automatically constructs a citation list that provides references between the research paper and other documents stored locally (i.e. on the desktop machine or on a LAN connected to the desktop machine). These local documents may include articles, E-mail, reference materials, and other documents. The system thus actively and automatically alerts the user of local information related to present work.

While the invention has been described in connection with what is presently considered to be the most practical and preferred embodiments, it is to be understood that the invention is not limited to the disclosed embodiments, but on the contrary it is intended to cover various modifications and equivalent arrangements included within the spirit and scope of the appended claims.

What is claimed is:

1. A computer-implemented method for determining the relevance of the content of a first set of documents to the content of a second set of documents, the method comprising: extracting from the first set of documents a corresponding first set of document extract entries and from the second set of documents a corresponding second set of document extract entries, wherein each entry in the first and second sets of document extract entries comprises a weighted word histogram for a corresponding document; generating from the first set of document extract entries a first set of word clusters, and generating from the second set of document extract entries a second set of word clusters, wherein each word cluster in the first and second sets of word clusters comprises a cluster word list, a total distance matrix, and a number of connections matrix; and determining a degree of similarity between clusters from the first set of word clusters and clusters from the second set of word clusters.

2. The method of claim 1 further comprising: deriving the first set of documents from a first data storage device.

3. The method of claim 2 wherein the deriving step comprises selecting the first set of documents from a set of files on the first data storage device, wherein the set of files contain files associated with a predetermined set of users.

4. The method of claim 1 wherein the extracting step comprises converting the first set of documents from text format to hypertext format.

5. The method of claim 1 further comprising: deriving the second set of documents from a second data storage device.

6. The method of claim 1 wherein each entry in the first set of document extract entries and in the second set of document extract entries further comprises a list of people and a list of companies.

7. The method of claim 1 wherein the weighted word histogram for a corresponding document comprises a set of histogram word records, wherein each word record comprises a word from the document, a word score, a number of appearances of the word in the document, and a list of position indices for the word within the document.

8. The method of claim 1 wherein the generating step comprises: grouping the word clusters within the first set of word clusters to form subsets of similar word clusters; and combining the similar word clusters within each subset to form a single word cluster for the subset.

9. The method of claim 8 wherein the grouping comprises: evaluating a measure of cluster similarity between a first word cluster and a second word cluster, where both the first and second word clusters are members of the first set of word clusters; and placing the first word cluster and the second word cluster in a common subset of similar word clusters if the measure of similarity exceeds a predetermined value.

10. The method of claim 9 wherein the evaluating step comprises: intersecting the first cluster and the second cluster, thereby dividing the first cluster into four first subclusters and the second cluster into four second subclusters; and calculating a function of the four first and four second subclusters, wherein the function comprises the calculation of a quantity chosen from the group consisting of a maximum value of matrix elements, a minimum value of matrix elements, a sum of diagonal matrix elements, a sum of off-diagonal matrix elements, and a sum of all matrix elements.

11. The method of claim 8 wherein the combining comprises: concatenating the word list of a first cluster and the word list of a second cluster to form a combined word list of a combined word cluster; merging the total distance matrix of the first word cluster and the total distance matrix of the second word cluster to form a total distance matrix of a combined word cluster; and merging the number of connections matrix of the first word cluster and the number of connections matrix of the second word cluster to form a number of connections matrix of a combined word cluster.

12. A computer-implemented method for determining the relevance of the content of a first set of documents to the content of a second set of documents, the method comprising:

extracting from the first set of documents a corresponding first set of document extract entries and from the second set of documents a corresponding second set of document extract entries, wherein each entry in the first and second sets of document extract entries comprises a weighted word histogram for a corresponding document;

generating from the first set of document extract entries a first set of word clusters, and from the second set of document extract entries a second set of word clusters, wherein each word cluster in the first and second sets of word clusters comprises a cluster word list, a total distance matrix, and a number of connections matrix; and determining a degree of similarity between clusters from the first set of word clusters and clusters from the second set of word clusters;

wherein:
the number of connections matrix for each word cluster comprises an N×N matrix, wherein N is equal to the number of words in the cluster word list, wherein the (i,j) entry of the number of connections matrix for i≠j contains a number of connections in the document between words i and j when word i precedes word j, and wherein the (i,i) entry of the number of connections matrix contains a number of appearances in the document of word i; and the total distance matrix for each word cluster comprises an N×N matrix, wherein the (i,j) entry of the total distance matrix for i≠j contains a total distance between words i and j for all connections in the document when word i precedes word j, and wherein the (i,i) entry of the total distance matrix contains a weight of word i in the document.

13. The method of claim 12 wherein the generating step comprises:
   determining the cluster word list by recursively calling a procedure that returns a list of words within a predetermined distance from a given word in the document, and
   calculating the number of connections matrix by repeatedly calling a procedure that determines the number of connections in the document between words i and j when word i precedes word j.

14. The method of claim 13 wherein the recursive calling of the procedure is limited to a predetermined recursive depth.

15. A computer-implemented method for determining the relevance of the content of a first set of documents to the content of a second set of documents, the method comprising:
   extracting from the first set of documents a corresponding first set of document extract entries and from the second set of documents a corresponding second set of document extract entries, wherein each entry in the first and second sets of document extract entries comprises a weighted word histogram for a corresponding document;
   generating from the first set of document extract entries a first set of word clusters, and from the second set of document extract entries a second set of word clusters, wherein each word cluster in the first and second sets of word clusters comprises a cluster word list, a total distance matrix, and a number of connections matrix; and
   determining a degree of similarity between clusters from the first set of word clusters and clusters from the second set of word clusters;
   wherein the determining step comprises:
      intersecting a first cluster from the first set of word clusters and a second cluster from the second set of word clusters, thereby dividing the first cluster into four first subclusters and the second cluster into four second subclusters; and
      calculating a function of the four first and four second subclusters, wherein the function comprises the calculation of a quantity chosen from the group consisting of a sum of diagonal matrix elements, a sum of off-diagonal matrix elements, and a sum of all matrix elements.

* * * * *